Jan. 18, 1949.  L. A. MAJNERI  2,459,663
HYDRAULIC BRAKING SYSTEM

Filed Dec. 11, 1944  2 Sheets-Sheet 2

INVENTOR.
LUDWIG A. MAJNERI
BY
Whittemore Hulbert & Belknap
ATTORNEYS

Patented Jan. 18, 1949

2,459,663

UNITED STATES PATENT OFFICE 2,459,663

HYDRAULIC BRAKING SYSTEM

Ludwig A. Majneri, Grosse Pointe, Mich., assignor to The Warner Aircraft Corporation, Detroit, Mich., a corporation of Michigan Application December 11, 1944, Serial No. 567,658

11 Claims. (Cl. 188—152)

1

This invention relates generally to hydraulic braking systems and has as its principal object to provide rapid release of the brakes.

While rapid release of the brakes is desirable in many different types of installations of hydraulic brakes, nevertheless, it is especially important in aircraft where two separate hydraulic braking systems are usually employed for the left and right hand wheels to facilitate maneuvering of the aircraft on the ground. For example, if the pilot desires to turn the aircraft to the right as it is traveling along the ground, the right hand brake is applied and is released when the required turn has been effected. If this brake fails to release promptly the turn will be greater than anticipated and may result in a serious accident. The danger resulting from delayed release of the brakes is particularly critical in large aircraft where the fluid pressure lines are necessarily long and the displacement accordingly high.

The present invention contemplates overcoming the above objection by providing means for accelerating release of the brakes to such an extent that the latter may be considered to release instantaneously regardless of the displacement of the brakes or length of the supply lines. In accordance with this invention fluid from the brake actuator not only returns to the system upon releasing the braking pressure in the actuator, but also flows directly into a storage chamber located in relatively close proximity to the brake. As a result the brake friction means is practically instantaneously disengaged from the braking surface when the braking pressure at the actuator is relieved.

With the above in view it is a further object of this invention to provide a valve between the storage chamber and brake actuator which operates immediately upon relieving the braking pressure in the system to by-pass fluid from the actuator to the storage chamber and to simultaneously return fluid pressure from the actuator to the reservoir in the system.

Another object of this invention is to provide means in the storage chamber for returning the fluid in the latter to the braking system after the brake is released.

The foregoing as well as other objects will be made more apparent as this description proceeds, especially when considered in connection with the accompanying drawings, wherein:

Figure 1 is a diagrammatic view of two independent hydraulic braking systems embodying this invention;

2

Although it will be apparent as this description proceeds that the invention may be advantageously employed in practically any hydraulic braking system where it is desired to insure substantially instantaneous release of the brakes, nevertheless, the invention is shown for the purpose of illustration as applied to aircraft of the type having two separate hydraulic braking systems.

Figure 1:
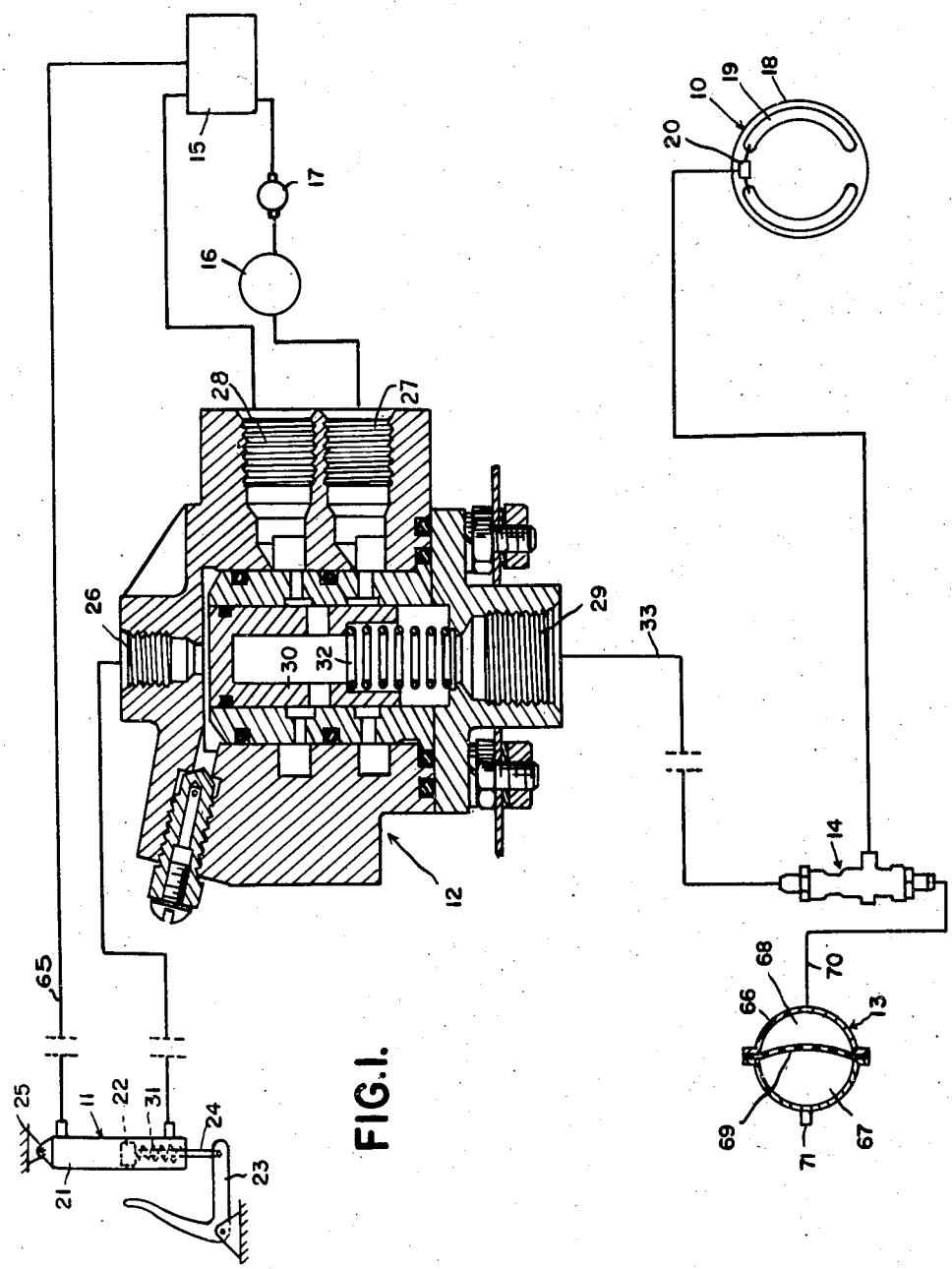

With the above in view, reference is now made to Figure 1 of the drawings, wherein it will be noted that each hydraulic braking system comprises a brake 10, a pressure producing device or master cylinder 11, a power valve 12 between the device 11 and brake, a storage chamber 13 and a releasing valve 14 positioned between the storage chamber and brake. A reservoir 15 and an accumulator 16 serve both braking systems. The accumulator 16 is of the type usually found on aircraft and contains a supply of fluid which is maintained at a relatively high pressure by a suitable pump 17.

The brake 10 in each system may be of any suitable construction comprising a brake drum 18 and brake friction means 19. In accordance with conventional practice the brake friction means is supported in the drum 18 and is operated by a suitable hydraulic actuator 20.

The pressure producing device or master cylinder 11 of each system may also be of standard construction comprising briefly a cylinder 21 and a piston 22 reciprocably mounted in the cylinder. The upper end of the cylinder communicates with the reservoir 15 and the lower end of the cylinder is connected to the power valve 12 in a manner to be more fully hereinafter described. The piston 22 is connected to a manually operable control 23 by means of a rod 24 and the upper end of the cylinder is suitably pivotally mounted on a support 25. The power valve 12 of each system selected for the purpose of illustration is shown in detail in my copending application Serial No. 546,347, filed July 24, 1944, now abandoned. Briefly, this valve comprises a pair of intake ports 26 and 27 which respectively communicate with the master cylinder 11 and the accumulator 16. A valve member 30 is supported for sliding movement in opposite directions and is normally located in the position shown in Figure 1, wherein it will be noted that the port 29 communicates with the port 28 to connect the brake actuator 20 to the reservoir 15. On the other hand when the master cylinder is operated to apply the brake 10 the valve member 30 is moved by fluid under pressure to a position wherein it opens communication between the ports 27 and 29. Thus fluid under pressure from the accumulator is permitted to flow to the brake actuator 20 for applying the brake friction means 19 against the drum 18.

When the operator releases the control 23, the master cylinder piston 22 is moved upwardly by a suitable spring 31 and fluid within the cylinder above the piston is permitted to pass through the piston to the portion of the cylinder below the piston. At this time the spring 32 returns the valve member 30 to the position shown in Figure 1 wherein the brake actuator is connected to the reservoir 15.

The valve 14 in each braking system comprises a casing 34 open at opposite ends for respectively receiving the fittings 35 and 36. Suitable O-rings 37 are provided for sealing the joints between the fittings and casing. The fitting 35 has a port 38 which is connected to the line 33 or power value 12 and the fitting 36 has a port 39 which is connected to the storage chamber 13. The casing 34 is provided with a third port 40 intermediate the ports 38 and 39 for connection to the hydraulic actuator 20.

Figure 2:
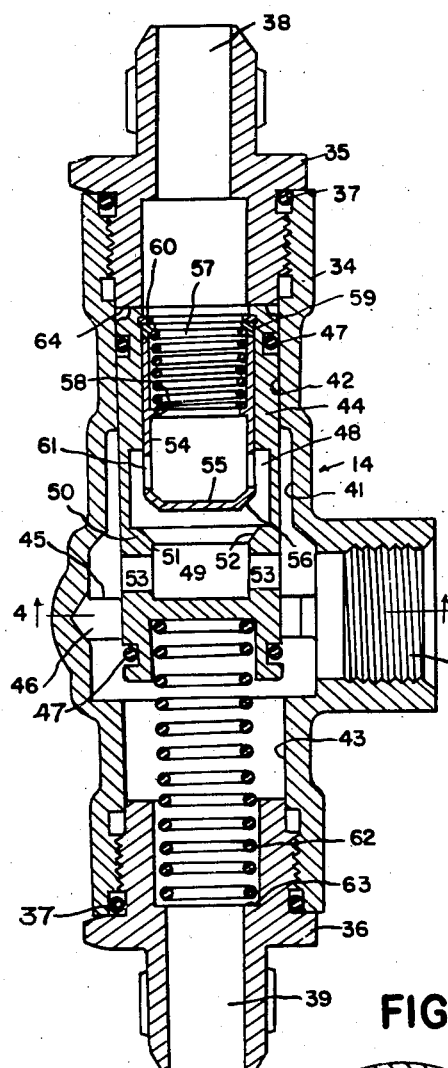
Figure 2 is a longitudinal sectional view through the releasing valve shown in Figure 1.
Figure 3:
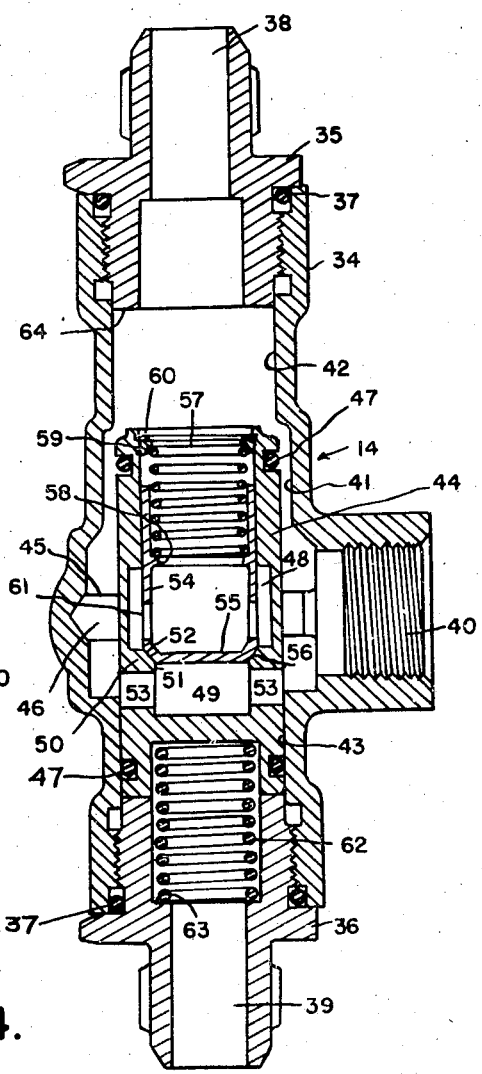
Figure 3 is a view similar to Figure 2 showing the valve in a different position.
Figure 4:
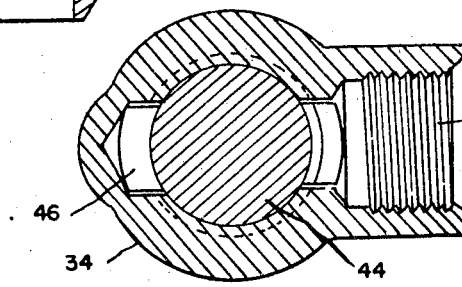
Figure 4 is a cross-sectional view taken substantially on the plane indicated by the line 4—4 of Figure 2.

As shown in Figures 2 and 3 of the drawings the casing 34 is also formed with a cylindrical chamber 41 intermediate the ends thereof in direct communication with the port 40. In addition the casing is formed with reduced cylindrical portions 42 and 43 at opposite ends of the chamber 41. A valve member 44 is movable in opposite directions in the casing 34 and the opposite ends of the member 44 alternatively occupy positions in the cylindrical portions 42 and 43 of the casing 34. The intermediate portion of the valve member 44 is slidably supported by a partition 45 in the chamber 41 and suitable openings 46 are formed in the partition to enable free flow of fluid in the chamber 41. Also suitable O-rings 47 are respectively mounted on opposite ends of the valve member 44 to prevent the escape of fluid under pressure past the ends of the valve member when the latter ends are respectively in engagement with the cylindrical portions 42 and 43 of the casing.

The valve member 44 is formed with two vertically spaced chambers 48 and 49 separated by a transverse wall 50 having a port 51 therethrough surrounded at the upper end with a valve seat 52. The chamber 49 communicates with the chamber 41 in all positions of the valve member 44 through a plurality of circumferentially spaced ports 53. However, communication between the chambers 48 and 49 is controlled by a valve 54 in the form of a sleeve closed at the bottom by a wall 55 and having a conically shaped surface 56 engageable with the seat 52 to close the port 51. The valve 54 is normally urged to the position shown in Figure 3 of the drawings wherein the surface 56 on the valve engages the seat 52 by a relatively weak spring 57 located in the valve with the lower end engaging a shoulder 58 on the valve 54 and with the upper end engaging a washer 59 held in position in the valve 44 by a snap ring 60.

The upper end of the valve 54 is open to receive fluid passing downwardly into the casing 34 through the port 38 and the side walls of the valve 54 are provided with ports 61 which communicate with the chamber 48. Thus it will be noted that while the valve 54 is carried by the valve member 44, it operates entirely independent of the latter. In this connection attention is also called to the fact that the valve 44 is normally urged to the position shown in Figure 3 of the drawings by a spring 62 supported in the casing below the valve member 44. As shown the top of the spring engages the bottom of the valve member 44 and the lower end of the spring abuts a shoulder 63 on the fitting 36. It follows from the above that the spring 62 normally urges the valve member 44 to the position shown in Figure 2 of the drawings, wherein the upper end of the valve member 44 extends into the portion 42 of the chamber and engages the shoulder 64 formed by the bottom of the fitting 35. In this position the lower end of the valve 44 assumes a position in the chamber 41 beyond the portion 43 of the casing 34 and communication is established between the latter chamber and port 39 through the end portion 43 of the casing 34.

Referring now to the operation of the braking system thus far described and considering only one of the systems since both systems shown operate in an identical manner, it will be noted that manual operation of the master cylinder 11 to apply the brake 10 supplies fluid under pressure to the power valve 12 through the inlet port 26. The fluid pressure acts on the valve member 30 to move the latter against the action of the return spring 32 to establish communication between the port 27 and the port 29. As a result, fluid under pressure from the accumulator 16 flows through the power valve 12 and line 33 to the port 38 in the releasing valve 14. The fluid entering the port 38 flows into the valve 54 and acts on the wall 55 to move the valve member 44 to the position shown in Figure 3 of the drawings wherein the upper end of the valve member 44 assumes a position in the chamber 41 below the cylindrical portion 42 of the casing 34. In this position of the valve member 44, fluid is free to pass into the chamber 41 and through the port 40 to the hydraulic actuator 20 to apply the brake 10. Fluid is prevented from escaping into the lower cylindrical portion 43 of the casing by reason of the fact that the lower end of the valve member occupies a position in the portion 43 and is sealed by the O-ring 47.

Assuming now that the operator releases the control 23, it will be noted that the piston 22 in the master cylinder is returned to its inoperative position in the cylinder by the spring 31 and fluid in the cylinder is conveyed to the reservoir 15 through the line 65. Also the pressure in the power valve 12 is reduced to such an extent as to permit the spring 32 to move the valve member to the position shown in Figure 1 of the drawings, wherein the ports 28 and 29 are connected through the valve member. As a result the brake actuator 20 is connected to the reservoir 15 and the pressure in the line 33 and in the hydraulic brake actuator immediately drops.

As the pressure drops in the line 33, the valve member 44 is moved upwardly to the position shown in Figure 2 of the drawings by the force exerted on the bottom of the valve member 44 by the spring 62. As the lower end of the valve member 44 moves out of the lower end 43 of the casing, fluid from the actuator is immediately by-passed into the chamber 13 through the port 39 and the brake 10 is instantaneously released.

Releasing of the brake 10 is further accelerated by opening the valve 54. As shown in Figure 2 of the drawings, fluid returning through the port 40 enters the chamber 49 in the valve member 44 and moves the valve 54 upwardly against the relatively weak spring 57. As a result, fluid flows into the chamber 48 through the port 51 and into the valve 54 through the ports 61. Inasmuch as the top of the valve 54 is open, it follows that the fluid passes through the port 38 into the line 33 and back to the reservoir 15 through the power valve 12.

The storage chamber 13 comprises a tank 66 divided into two compartments 67 and 68 by a flexible diaphragm 69. The compartment 68 communicates directly with the port 39 of the releasing valve 14 through a relatively short line 70 and the compartment 67 is equipped with an air valve 71 through which air may be introduced into the compartment 67 to initially load the diaphragm. The pressure provided in the compartment 67 is considerably lower than the brake applying pressure, but is sufficient to return practically all of the fluid in the compartment 68 to the line 33 or reservoir after the brake friction means 19 is completely released from the brake drum.

The two braking systems shown in Figure 1 of the drawings operate in an identical manner, either simultaneously or independently. Releasing means of the above type is provided in both systems so that practically instantaneous releasing of the brakes is insured.

What I claim as my invention is:

1. A hydraulic braking system having a brake provided with brake friction means, a hydraulic actuator for the brake friction means, a pressure producing device for supplying fluid under pressure to the actuator to apply the brake, a chamber adapted to receive a quantity of fluid, and means operable in response to a drop in pressure at the pressure producing device to by-pass fluid from the brake actuator into said chamber.

2. A hydraulic braking system having a brake provided with brake friction means, a hydraulic actuator for the brake friction means, a master cylinder for supplying fluid under pressure to the actuator to apply the brake, a device adapted to receive a quantity of fluid, and a valve between the hydraulic actuator and master cylinder in response to a drop in pressure at the said master cylinder to connect both the master cylinder and device to the brake actuator operable.

3. A hydraulic braking system having a brake provided with brake friction means and having a reservoir, a hydraulic actuator for the brake friction means, means for supplying fluid under pressure to the actuator for applying the brake, a storage chamber for braking fluid, and a valve between the chamber and hydraulic actuator operable upon releasing the brake applying means to connect the actuator to both the reservoir and said storage chamber.

4. A hydraulic braking system having a brake provided with brake friction means, a hydraulic actuator for the brake friction means, means for supplying fluid under pressure to the actuator and to apply the brake including a naster cylinder, a storage device for fluid, valve means operable upon releasing the brake applying means to connect both the master cylinder and storage device to the brake actuator, and means for returning the by-passed fluid to the hydraulic braking system through said valve means.

5. A hydraulic braking system having a brake provided with brake friction means, a hydraulic actuator for the brake friction means, a pressure producing device for supplying fluid under pressure to the actuator to apply the brake, means responsive to a drop in pressure at the pressure producing device to by-pass fluid from the actuator, and an expansible chamber for receiving the by-passed fluid having means for returning the by-passed fluid to the pressure producing device after the brake is released.

6. A hydraulic braking system having a brake provided with brake friction means, a hydraulic actuator for the brake friction means, a pressure producing device having a fluid connection with the brake actuator for supplying fluid under pressure to the actuator to apply the brake, a chamber adapted to receive a quantity of fluid, a valve between the chamber and brake actuator responsive to the drop in pressure in the fluid connection aforesaid resulting from releasing the pressure producing device to by-pass fluid from the hydraulic actuator to said chamber, and means for returning the fluid by-passed into said chamber back to the pressure producing device after the brake is restored to its released position.

7. A hydraulic braking system having a brake provided with brake friction means, a hydraulic actuator for the brake friction means, means for supplying fluid under pressure to the actuator to apply the brake, a storage device for fluid positioned in relatively close proximity to the brake, a valve operable upon releasing the brake applying means for by-passing fluid from the actuator directly into the storage device, and pressure actuated means in said storage device for returning the by-passed fluid from the device through the valve to the fluid pressure supply means after the brake is restored to its released position.

8. A hydraulic braking system having a brake provided with brake friction means, a hydraulic actuator for the brake, operating means movable to one position to supply fluid under pressure to the actuator for applying the brake and movable to another position to permit return of fluid from the actuator to the system for releasing the brake, means connecting the operating means to the actuator including a supply line, a storage chamber positioned adjacent the brake and also adapted to communicate with the actuator, a valve in the supply line between the actuator and chamber, said valve being movable to close communication to the storage chamber and to open communication to the actuator in response to the flow of fluid under pressure through the supply line from the operator and responsive to the drop in pressure in the line resulting from movement of the operator to its brake releasing position to open communication to the storage chamber for by-passing fluid from the actuator to the latter chamber.

9. A hydraulic braking system having a brake provided with brake friction means, a hydraulic actuator for the brake, operating means movable to one position to supply fluid under pressure to the actuator for applying the brake and movable to another position to permit return of fluid from the actuator to the system for releasing the brake, means connecting the operating means to the actuator including a supply line, a storage chamber positioned adjacent the brake and also adapted to communicate with the actuator, a valve in the supply line between the actuator and chamber, said valve being movable to close communication to the storage chamber and to open communication to the actuator in response to the flow of fluid under pressure through the supply line from the operator and responsive to the drop in pressure in the line resulting from movement of the operator to its brake releasing position to open communication to the storage chamber and to the supply line whereby fluid from the actuator is free to flow to the storage chamber and back to the system, and means in the storage chamber for returning the by-passed fluid in the chamber to the braking system through said valve after the brake is restored to its released position.

10. A hydraulic braking system having a brake provided with brake friction means and having a reservoir, a hydraulic actuator for the brake friction means, means for supplying fluid under pressure to the actuator for applying the brake, a storage chamber for braking fluid, and a valve between the chamber and hydraulic actuator operable upon releasing the brake applying means to connect the actuator to both the reservoir and said storage chamber, a valve located between the chamber and hydraulic actuator responsive to the drop in pressure resulting from releasing the brake applying means to by-pass fluid from the actuator directly into the chamber and to also connect the actuator to the reservoir, and means in the chamber for returning the fluid by-passed into the chamber back to the reservoir through the valve.

11. A hydraulic braking system having a brake provided with brake friction means, a hydraulic actuator for the brake friction means, pressure producing means having a fluid connection with the actuator for operating the actuator to apply the brake, a chamber adapted to receive a quantity of fluid and having means associated therewith for applying a pressure to the fluid, and a valve positioned in the fluid connection between the pressure producing means and brake actuator responsive to a drop in pressure in the fluid connection to bypass fluid from the actuator to the chamber and having provision for connecting said chamber to the pressure applying means to enable return of fluid bypassed into the chamber to the pressure applying means.

LUDWIG A. MAJNERI.

REFERENCES CITED

The following references are of record in the file of this patent:

UNITED STATES PATENTS

| Number | Name | Date |
|---|---|---|
| 2,190,120 | Kohler | Feb. 13, 1940 |